United States Patent [19]
Addeo et al.

[11] Patent Number: 5,527,570
[45] Date of Patent: Jun. 18, 1996

[54] MULTILAYER MULTIFUNCTIONAL PACKAGING ELEMENTS

[75] Inventors: Antonio Addeo, Novara; Annibale Vezzoli, Como; Gianluigi Vestrucci, Milan, all of Italy

[73] Assignee: Centro Sviluppo Settori Impiego S.R.L., Milan, Italy

[21] Appl. No.: 292,239

[22] Filed: Aug. 17, 1994

Related U.S. Application Data

[63] Continuation-in-part of Ser. No. 904,833, Jun. 26, 1992, abandoned.

[30] Foreign Application Priority Data

Jun. 28, 1991 [IT] Italy .................. MI91A1795

[51] Int. Cl.$^6$ .............. B29D 22/00; B32B 27/08
[52] U.S. Cl. .......... 428/35.7; 428/335; 428/516; 428/520; 426/129
[58] Field of Search .................. 428/357, 516, 428/520, 335

[56] References Cited

U.S. PATENT DOCUMENTS

| | | |
|---|---|---|
| 4,939,030 | 7/1990 | Tsuji . |
| 4,943,459 | 7/1990 | Nedzu . |
| 5,143,763 | 9/1992 | Yamada . |

OTHER PUBLICATIONS

AB (WPAT) 92–201124/95, Halstrick et al, German 4039354.

*Primary Examiner*—P. C. Sluby
*Attorney, Agent, or Firm*—Bryan Cave

[57] ABSTRACT

Multilayer and multifunctional packaging elements having a high-absorption activity toward aqueous liquid substances as well as barrier properties toward gases such as oxygen and carbon dioxide are prepared by thermoforming.

The packaging elements includes an inner porous layer, an intermediate absorbing layer and an outer sheet having high barrier properties toward gases. The intermediate layer may contain anti-bacterial agents.

6 Claims, 1 Drawing Sheet

MULTILAYER MULTIFUNCTIONAL PACKAGING ELEMENTS

CROSS-REFERENCE TO RELATED APPLICATION

This application is a continuation-in-part of our application Ser. No. 07/904,833, filed Jun. 26, 1992, now abandoned.

BACKGROUND OF THE INVENTION

The present invention relates to thermoformed multilayer and multifunctional packaging elements, and to a process for preparing the same.

More particularly, it relates to thermoformed packaging elements endowed with a high absorption activity toward aqueous liquid substances as well as with barrier properties toward gasses such as oxygen and carbon dioxide. These packaging elements are prepared by thermoforming a multilayer and multifunctional polymeric system.

According to another aspect, the present invention relates to a process for preparing the thermoformed packaging elements, which is free from the use of adhesives and binders dispersed in solvents.

The term "thermoformed packaging element", as used in the present description and in the claims, is intended to mean whatever element, structural or not, rigid or flexible, circular or polygonal, employed in the packaging field and, particularly, containers, covers, "food-grade" panels such as, for instance, trays or boxed for the packaging of meat, vegetables, fruit or cheese.

At present, the above mentioned articles are usually obtained by the technique of thermoforming thermoplastic sheets which may be coextruded or blown, and have nearly no capacity for absorbing aqueous liquid substances.

According to another previously known technique, an absorbing layer is introduced during the packaging. Such absorbing layer is usually made of cellulose fiber having high liquid absorbing properties, and can be optionally associated with a thin and impermeable drainage layer which is made of a perforated plastic material.

However, the above packaging system has several disadvantages, one of which is its limited ability to be recycled.

SUMMARY OF THE INVENTION

According to the present invention, these drawbacks can be overcome by introducing an absorbing layer between the bottom of the container and a porous drainage layer which is in contact with the packaged food product.

The liquid which comes out of the product passes through the porous layer and is uniformly absorbed by the underlying absorbing layer, thus eliminating any free liquid residue.

The materials used in the various layers of the multilayer packaging elements are homomaterials. That is, they are highly chemically compatible, and have similar physical properties.

The multilayer and multifunctional packaging elements of the present invention have both high absorbing properties of aqueous liquid substances, and high impermeability toward gases such as oxygen and carbon dioxide.

The process for preparing the packaging elements of the invention does not use adhesives and binders dispersed in solvents for the linking of the layers, and also does not require the introduction of absorbing layers during packaging.

This process produces several advantages in comparison with those for the traditional cellulose fiber layer device, such as a much higher productivity in manufacturing and packaging, and enhanced recyclability of the container.

Moreover, the preparation of the multilayer packaging can be achieved in a unique (In-Line) process, by thermal coupling of a bi-layer comprising the absorbing layer and the drainage layer with a multilayer sheet having high barrier properties.

The recyclability of the packaging elements of the invention is due to the use of homomaterials—highly chemically compatible thermoplastic materials—so that it is possible to re-utilize the production scraps, as well as used and discarded containers.

By contrast, when cellulose fiber layers are utilized in such a package, its recyclability is seriously jeopardized because of the heterogeneity of the employed materials.

DETAILED DESCRIPTION OF THE INVENTION

Figure 1:
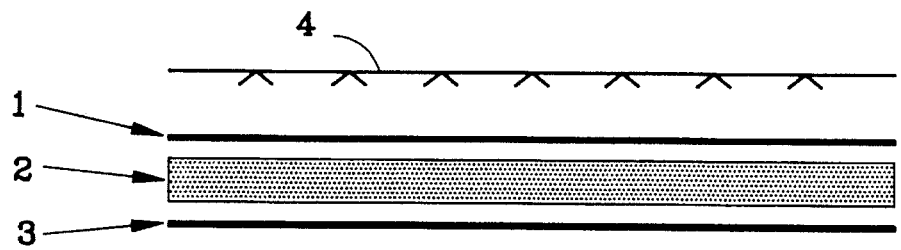
FIG. 1 shows, in an exploded side view, the three layers which make up the multilayer packaging element of the present invention, and a heating means for thermoforming the multilayer sheet.

The multilayer and multifunctional packaging element of the present invention is made of thermoformed thermoplastic materials, endowed with high barrier properties toward gases and high absorbing properties of liquid aqueous substances, and comprises:

(a) an intermediate absorbing layer (2), (b) an outer sheet having high barrier properties towards gases (3), and (c) an inner porous layer (1), wherein, (i) the intermediate absorbing layer 2 is coupled without adhesives to, and is in contact with, the outer sheet 3 and to the inner porous layer 1, and (ii) the materials of the intermediate absorbing layer 2, the inner porous layer 1, and the outer sheet 3 are highly chemically compatible.

The intermediate absorbing thermoplastic layer 2 can be constituted by a compact sheet which is rendered absorbent by a suitable formulation of expanded and/or fibrous nature such a needled non-woven fabric.

Any thermoplastic polymer is suitable for use as the intermediate absorbing layer. Preferred polymers are acrylic and/or metha-acrylic resins, polypropylene, shock-resistant polypropylene and its derivatives.

The intermediate absorbing layer may contain an antibacterial agent to inhibit the growth of bacteria when food products are stored in the packaging elements of the present invention. Examples of such anti-bacterial agents are sorbic acid and *Trichoderma viridae* spores.

No particular limitation exists for the outer sheet 3, except that it is made of thermoplastic polymers.

Examples of suitable thermoplastic are polystyrene, shock-resistant polystyrene, styrenic alloys such as ABS, SAN, etc., polyvinylchloride, high, medium and low density polyethylene, polypropylene, shock-resistant polypropylene, crystalline copolymers, ethylene/propylene acrylic and/or methacrylic resins, polymethacrylates, polyester resins such as PET or polybutylene terapthalate.

Preferred polymers are polystyrene, shock-resistant polystyrene, styrenic alloys, polypropylene and shock-resistant polypropylene.

The inner high porosity thin layer 1 for the drainage of the liquid can be made of any thermoplastic polymer.

According to another aspect, the present invention relates to a process for preparing the thermoformed packaging elements which comprises the following steps:

(a) coupling an intermediate layer of thermoplastic material having high absorption activity toward aqueous liquid substances on an outer sheet of thermoplastic material, endowed with high barrier properties toward gases;

(b) coupling on said intermediate layer an inner porous layer of thermoplastic material for the drainage of the liquid, thus obtaining a thermoplastic multilayer sheet;

(c) heating said thermoplastic multilayer sheet to a temperature equal to, or slightly higher than, its softening point;

(d) thermoforming the thermoplastic multilayer sheet by means of a conventional technique.

In the thermoforming process a suitable finish of the rims has to be created so that, once the food product has been packed, a further thin film having high barrier properties toward gases can be placed on the food and thermoformed on the rims.

In order to achieve the thermoforming, the multilayer thermoplastic sheet, having an average thickness ranging from 0.2 to 5 mm, is heated to a temperature close to the softening point by means of known techniques, for instance by use of an infra-red irradiation, or by an electrically heated plate 4.

The choice of said temperature depends on the polymer employed and is generally higher than 100° C., preferably ranging from 120° to 200° C.

The thermoforming of the multilayer thermoplastic sheet can be performed by means of different, conventional techniques. For instance, vacuum can be applied in the mold if this has a low drawing ratio, or a counter-mold can be used which contributes to form the sheet.

The accompanying drawing describes, by way of example, one embodiment of the invention.

The operation of the process is apparent from the drawing and from the description of the invention.

Figure 2:
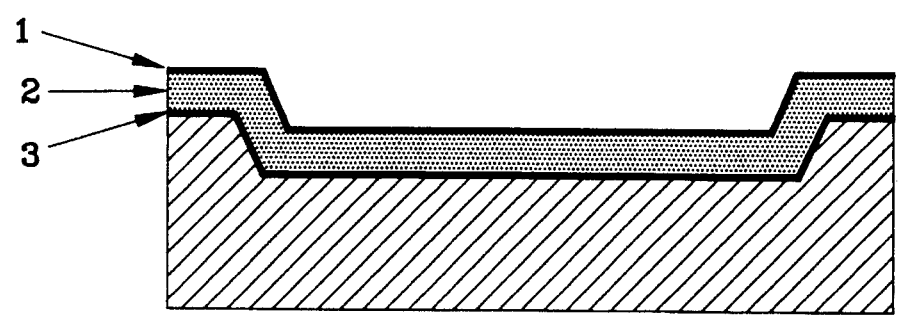
FIG. 2 shows, in a side view, the use of a vacuum mold to thermoform the multilayer packaging element of FIG. 1.
Figure 3:
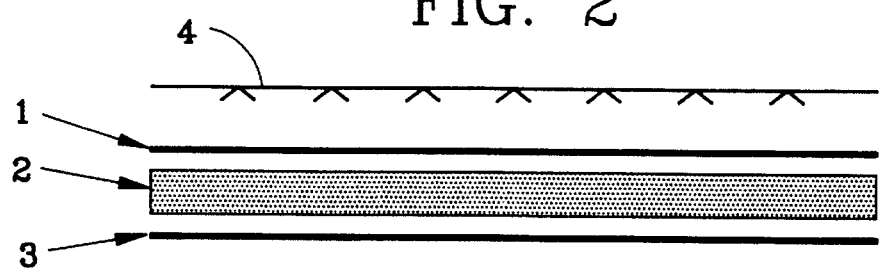
FIG. 3 shows, in an exploded side view, the three layers which make up the multilayer packaging element of the present invention, and a heating means for thermoforming the multilayer sheet.
Figure 4:
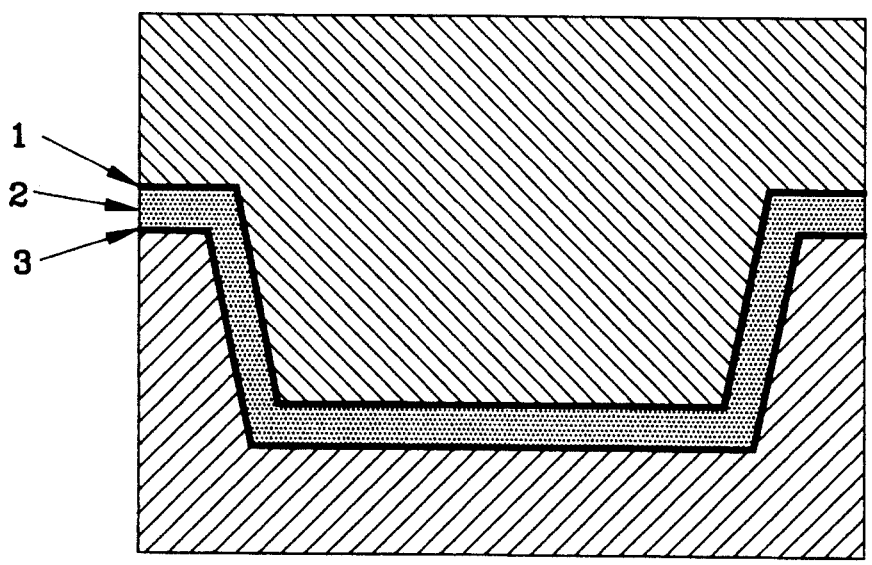
FIG. 4 shows, in a side view, the use of a counter mold to thermoform the multilayer packaging element of FIG. 3.

In the drawing, FIG. 1 is an exploded side view illustrating the production of multilayer packaging elements in accordance with the invention. Referring to the drawing, an intermediate absorbing layer 2 is interposed between an outer sheet 3 having high barrier properties and with an inner high porosity thin layer 1, thus obtaining a multilayer sheet which is then thermoformed. The thermoforming can take place in a vacuum mold, as shown in FIG. 2, or in countermold, as shown in FIG. 4, or in other ways known to those skilled in the art.

The invention is further illustrated by the following examples.

Example 1

A polypropylene felt made by the Italian company Moplefan, having a weight of 220 g/m² and a thickness of about 4 mm, characterized by a high absorbing power for aqueous liquid substances, was coupled to a 35 micron thick polypropylene film by passing it through a three-cylinder calendaring line.

The polypropylene film that was employed was highly porous, by virtue of microdrilling with hot needles during the case extrusion process to make the film. The film had 36 microdrillings per square inch, each of them with a diameter or 400 microns. The microdrilled film was prepared from Hifax 7036, a polypropylene made by the company Himont. Coupling of the polypropylene felt on the microdrilled film was accomplished by surface melting during the passage through the three-cylinder calendaring line. More particularly, adhesion of the felt and the film was obtained in the passage between the lower cylinder, kept at 25° C., and the middle cylinder which was heated to a temperature of 135° C.

The bi-layer thus obtained from the absorbing felt and microdrilled film was subsequently coupled to a multilayer sheet having high barrier properties toward gases. Coupling of the bi-layer to the multilayer sheet was accomplished in line after the preparation of the multilayer, by a coextrusion process.

More particularly, the following polymers were used: a) Moplen EP2530B, a random polypropylene made by Himont; b) Clarene R-20, an EVOH copolymer (ethylene-vinyl alcohol copolymer); and c) a polyolefin adhesive polymer. These were fed into a coextrusion line made by Colines and working with a three-extruder Cloeren system.

The multilayer sheet, PP/adhesive/EVOH/adhesive/PP, with the thickness of the layers being respectively 350/15/25/15/350 microns, coming out of a head with a rectangular slit of 1000×1.0 mm heated to a temperature of 220° C., was conveyed into a three-cylinder calendaring system which is normally intended for the cooling of the sheet. The bi-layer felt/microdrilled film was made to adhere to the multilayer sheet at the input of the three-cylinder calendaring system before the cooling phase. Adhesion was accomplished by melting of the outer layer of the felt on the sheet. In order to avoid excessive melting of the absorbing polypropylene felt, the contact time was kept short.

The most convenient way to adjust the contact time at high temperature is based on the control of the temperature of the three cylinders which normally define the cooling rate of the sheet. The temperature of the three cylinders was set at the following values: lower cylinder 60° C., middle cylinder 80° C., upper cylinder 60° C. At the end of the extrusion process a multilayer element, made up of a sheet endowed with high barrier properties toward gases, an absorbing felt and a microdrilled film, was formed into a bobbin.

The molding of the multilayer element was accomplished using a discontinuous laboratory molding machine VFM of 550×450 mm size, using a tray mold of 235×175 mm size and a depth of 40 mm. The volume of the tray was thus 1.650 cm³. Heating of the multilayer element was carried out only on the side of the sheet endowed with high barrier properties toward gases (outer side of the tray), using an infrared radiating panel set at a temperature of 350° C. and placed at a distance of about 15 cm from the sheet. The element was heated for 25 seconds up to a temperature of about 145° C. and then shaped in the mold by using a countermold and applying vacuum through a number of holes in the mold.

After cutting, the thermoformed tray illustrated in FIG. 1 was physically tested for absorbing power and permeability. The following values were obtained:

| | |
|---|---|
| Size: | 235 × 175 × 40 mm |
| Area: | 740 cm$^2$ |
| Volume: | 1650 cm$^3$ |
| Water absorption | 12 cm$^3$/dm$^2$ |
| Permeability, expressed as gas transmitted (TR) through the entire tray: | |
| O$_{2TR}$ 2.4 cm$^3$ 24 h atm | |
| CO$_{2TR}$ 10 cm$^3$ 24 h atm | |

Example 2

A polypropylene felt made by the Italian company Mople-fan, having a weight of 220 g/m$^2$ and a thickness of about ¾ mm, characterized by a high absorbing power for aqueous liquid substances, was coupled to a 35 micron thick polypropylene film by passing it through a three-cylinder calendaring line. This polypropylene film was highly porous, by virtue of microdrilling with hot needles during the cast extrusion process to make the film. The film had 36 microdrillings per square cm, each of them with a diameter of 400 micron in order to achieve an optimum porosity. The microdrilled film was prepared from Hifax 7036, a polypropylene made by the company Himont.

The coupling of the polypropylene felt on the microdrilled film was accomplished by surface melting in the passage through the three-cylinder calendaring line. More particularly, adhesion was obtained in the passage between the lower cylinder, kept at 25° C., and the middle cylinder which was heated to a temperature of 135° C.

The bi-layer obtained was then used as an absorbing element in the preparation of molded packaging elements. The mold having a cavity with a dimension of 180×120×33 mm and a thickness of 1.0 mm, was positioned on the vertical platens of an injection molding machine produced by Negri and Bossi, Model 225.

The absorbing bi-layer was laid into the male half of the open mold in such a way that its polypropylene film side came into contact with the wall of the mold and its polypropylene felt side was turned toward the inner part of the cavity.

Thereafter, the mold was closed and a melted mass of polypropylene homopolymer having a melt flow index of 10 g/10', known as MOPLEN X30G and made by Himont, was injected through a channel in the female half.

The operative conditions of the injection were regulated to involve the squashing of the polypropylene felt by the melted mass of polypropylene. Therefore, a relatively low flow rate (appr. 20 g/sec) was maintained during injection and, in particular, no post pressure of maintenance was applied at the end of the injection.

The obtained product was a tray wherein the absorbing layer became partially compact due to a reduction to two thirds of its original thickness. Nevertheless the absorbing layer showed a water-absorbing capacity remarkably higher than the common absorbing cellulose layers (see Table 1).

The tray obtained was tested for the preservation of foodstuffs (meat) in comparison with thermoformed trays available on the market and constituted by a multilayer of PST/EVOH/PE and a cellulose absorbing layer (surface of 1 dm$^2$) bonded adhesively to the internal bottom of the tray.

Table 2 shows the characteristics of the trays used in this test. In view of the different free volumes of the trays to be tested, the meat was used in such a quantity as to obtain the same volume/grams ratio of meat (3.15 cm$^3$/g) per tray.

The meat was treated, before wrapping, with carbon dioxide to saturation.

The meat was wrapped in both kinds of tray in an atmosphere of $N_2$—$CO_2$—$O_2$ in a volume ratio of 8.5:29:62, by sealing with a coextruded barrier film constituted by polypropylene/EVOH/polypropylene having a thickness of 110 microns, of which the EVOH thickness was 15 microns.

The wrapped trays were kept in a refrigerator at a temperature of 5°–6° C. After 1, 3, 6 and 8 days, they were tested for analysis of the internal gas atmosphere and for microbial growth.

The results obtained are reported in Table 3. These results show that both kinds of tray have similar functionality. There was no apparent difference either in color or in smell of the meats wrapped up in the tested trays.

Example 3

A polypropylene felt made by the Italian company Mople-fan, having the characteristics described in Example 2, was immersed in an alcohol solution (2%) of sorbic acid (FU Carlo Erba). Thereafter, the felt was dried under calendaring at 80° C. The residence time in said solution was 2 seconds, which was sufficient to obtain an absorption of 5–7 ml solution/dm$^2$ felt. After drying, the felt contained 100–140 mg/dm$^2$ of sorbic acid.

The coupling of the polypropylene felt to the polypropylene microdrilled film was accomplished according to Example 1 using the same kind of microdrilled film. The resulting bi-layer was used according to the procedure described in Example 2 for the production of a packaging element.

The obtained packaging element had a water absorption capacity of 8 ml/dm$^2$.

The determination of the sorbic acid content was carried out by gas chromatography. The tray obtained was cut into small pieces and extracted by ethyl-ether containing orthophosphorous acid and valeric acid. The obtained extract was injected into a programmed gas-chromatography unit and analyzed by using: Carbowax 20M glass column—3% of teraphthalic acid onto Chromosorb w (Aw-DMCS) 60–80 mesh, length of 2 m, diameter of 6×4.

The antibacterial effect of the sorbic acid was determined in the following way. Five trays were used in this experiment. 7 ml of serum of bovine meat was absorbed by each of the trays. For comparative purpose 5 trays prepared according to Example 2, without ascorbic acid, were used and treated also with 7 ml of the same serum. The serum used in this experiment was previously diluted with sterile water in order to obtain a total live battery of 10,000 UFC (unit of formed colony)/ml. The trays were closed according to the method described in Example 1, and maintained at a temperature of 5° C. for 6 days. For the purpose of microbiological analysis, each tray was washed with 30 ml of cripton salt and the obtained liquid was inoculated onto an Agar plate.

The results obtained were extrapolated to 7 ml of serum used for each of the trays and are shown in Table 4.

Example 4

A polypropylene felt made by the Italian company Mople-fan, having the characteristics described in Example 1, was immersed into a container. A vacuum of 15 mmHg was created inside the container. Thereafter, in order to test the antibacterial effect of live *Trichoderma viridae* spores, an aqueous suspension of Tween 80 (2%)(polyoxyethylene sorbitanmonostearate obtained from FLUKA), with infusorial earth and fungi spores of *Trichoderma viridae* was introduced therein.

The aqueous suspension was prepared from highly sporulated *Trichoderma viridae* culture on Agar plate. The plates containing said cultures were dried for several days at 60°–70° C. The chopped Agar was mixed with infusorial earth and the obtained mixture was sieved on a 100 micron mesh.

The obtained powder was suspended in sterile water containing 0.2% of Tween. The obtained suspension contained 10% of infusorial earth with a germinable spore concentration of 100,000 to 150,000/ml.

The felt, which absorbed this suspension, was calendared and dried according to Example 2. The increase in weight of the dried felt was equal to 400 g of infusorial earth/dm$^2$ and 450,000 UFC/dm$^2$.

The coupling of the polypropylene felt to the polypropylene microdrilled film was accomplished according to the method of Example 1 and with the use of the same type of microdrilled film. The preparation of the packaging element was carried out according to the method of Example 1.

To determine the amount of *Trichoderma viridae* spores embedded in the tray using this method, the germination of the spore embedded in the tray was carried out by extracting the chopped tray with cripton salt and inoculating the extract on Agar plate. The trays had live *Trichoderma viridae* spore of 10,000 to 20,000 UFC/dm$^2$ The tray prepared according to this Example absorbed 6 to 9 ml of aqueous suspension.

The antibacterial effect was determined according to Example 3. The results are reported in Table 5.

Variations can of course be made without departing from the spirit or scope of this invention.

TABLE 1

|  | TRADITIONAL ABSORBENT | POLYPROPYLENE FELT ABSORBENT 220/G/M$^2$ |
|---|---|---|
| ABSORPTION AS SUCH ml/dm$^2$ | 5 | 17 |
| ABSORPTION AFTER MOLDING ml/dm$^2$ | — | 8 |

TABLE 2

| TRAY | TRAY AVAILABLE ON THE MARKET | TRAY ACCORDING TO EXAMPLE 2 |
|---|---|---|
| COMPOSITION | PST/EVOH/PE | PP/PP |
| AVERAGE THICKNESS μm | 480/550 | 1000 |
| AVERAGE WEIGHT g | 29 | 37 |
| DIMENSION mm | 220 × 150 × 35 | 180 × 120 × 33 |
| VOLUME ml | 1100 | 800 |
| FILM FOR SEALING | | |
| COMPOSITION | PE/EVOH/PE | PP/EVOH/PP |
| THICKNESS μm | 110 | 110 |

TABLE 3

| | 1 DAY ATMOSPHERE | | | | 3 DAYS ATMOSPHERE | | | | 6 DAYS ATMOSPHERE | | | | 8 DAYS ATMOSPHERE | | | |
|---|---|---|---|---|---|---|---|---|---|---|---|---|---|---|---|---|
| | N$_2$ % | O$_2$ % | CO$_2$ % | UFC/G | N$_2$ % | O$_2$ % | CO$_2$ % | UFC/G | N$_2$ % | O$_2$ % | CO$_2$ % | UFC/G | N$_2$ % | O$_2$ % | CO$_2$ % | UFC/G |
| TRAY AVAILABLE ON THE MARKET | 7.4 | 69.5 | 23.0 | 10 × 10$^5$ | 7.3 | 69.7 | 22.9 | 36.5 × 10$^5$ | 10.1 | 62.4 | 27.4 | 500 × 10$^5$ | 4.2 | 67.1 | 28.9 | 1,000 × 10$^5$ |
| | 8.8 | 68.7 | 22.4 | 3 × 10$^5$ | 10.5 | 67.0 | 22.4 | 18.8 × 10$^5$ | 7.3 | 66.9 | 25.7 | 20 × 10$^5$ | 4.1 | 68.7 | 27.2 | 500 × 10$^5$ |
| TRAY ACCORDING TO EXAMPLE 2 | 10.4 | 61.1 | 28.6 | 2.5 × 10$^5$ | 11.7 | 58.8 | 29.5 | 1.5 × 10$^5$ | 11.4 | 62.7 | 25.9 | 80 × 10$^5$ | 7.4 | 63.6 | 29.0 | 3,000 × 10$^5$ |
| | 12.5 | 57.9 | 29.6 | 0.4 × 10$^5$ | 13.3 | 64.3 | 22.6 | 42.8 × 10$^5$ | 10.4 | 61.0 | 26.6 | 20 × 10$^5$ | 8.2 | 64.7 | 27.1 | 1,500 × 10$^5$ |

TABLE 4

| | U.F.C. UNIT OF FORMED COLONY/ 7 ML SERUM | |
|---|---|---|
| TRAYS | AT THE BEGINNING | AFTER 6 DAYS |
| TRAYS WITH SORBIC ACID | | |
| 1) | 5.6 × 10$^5$ | 32 × 10$^5$ |
| 2) | 5.6 × 10$^5$ | 180 × 10$^5$ |
| 3) | 5.6 × 10$^5$ | 87 × 10$^5$ |
| 4) | 5.6 × 10$^5$ | 48 × 10$^5$ |

TABLE 4-continued

| TRAYS | U.F.C. UNIT OF FORMED COLONY/ 7 ML SERUM | |
|---|---|---|
| | AT THE BEGINNING | AFTER 6 DAYS |
| 5) | $5.6 \times 10^5$ | $60 \times 10^5$ |
| MEAN VALUE | | $83 \times 10^5$ |
| TRAYS WITHOUT SORBIC ACID | | |
| 1) | $5.6 \times 10^5$ | $14,000 \times 10^5$ |
| 2) | $5.6 \times 10^5$ | $9,000 \times 10^5$ |
| 3) | $5.6 \times 10^5$ | $43,000 \times 10^5$ |
| 4) | $5.6 \times 10^5$ | $12,500 \times 10^5$ |
| (COMPARATIVE TEST) 5) | $5.6 \times 10^5$ | $4,200 \times 10^5$ |
| MEAN VALUE | | $16,500 \times 10^5$ |

TABLE 5

| TRAYS | U.F.C. (UNIT OF FORMED COLONY)/ 7 ML SERUM | |
|---|---|---|
| | AT THE BEGINNING | AFTER 6 DAYS |
| TRAYS WITH *TRICHODERMA VIRIDAE* | | |
| 1) | $8.5 \times 10^5$ | $69 \times 10^5$ |
| 2) | $8.5 \times 10^5$ | $97 \times 10^5$ |
| 3) | $8.5 \times 10^5$ | $120 \times 10^5$ |
| 4) | $8.5 \times 10^5$ | $90 \times 10^5$ |
| 5) | $8.5 \times 10^5$ | $360 \times 10^5$ |
| MEAN VALUE | | $147 \times 10^5$ |
| TRAYS WITHOUT *TRICHODERMA VIRIDAE* | | |
| 1) | $8.5 \times 10^5$ | $15,200 \times 10^5$ |
| 2) | $8.5 \times 10^5$ | $10,500 \times 10^5$ |
| 3) | $8.5 \times 10^5$ | $12,000 \times 10^5$ |
| 4) | $8.5 \times 10^5$ | $6,500 \times 10^5$ |
| (COMPARATIVE TEST) 5) | $8.5 \times 10^5$ | $7,500 \times 10^5$ |
| MEAN VALUE | | $10,200 \times 10^5$ |

What is claimed is:

1. A multilayer and multifunctional packaging element of thermoformed material, endowed with high barrier properties toward gases and high absorbing properties of liquid aqueous substances, the packaging element comprising the following layers:

(a) an intermediate absorbing layer, (b) an outer sheet having high barrier properties towards gases, and (c) an inner porous layer, wherein, (i) each layer comprises a polymeric thermoplastic material, (ii) the intermediate absorbing layer is coupled without adhesives to, and is in contact with, the outer sheet and to the inner porous layer, and (iii) the materials of the intermediate absorbing layer, the inner porous layer, and the outer sheet are chemically compatible.

2. A packaging element according to claim 1, wherein the intermediate absorbing layer is a polymeric thermoplastic material selected from the group consisting of acrylic resins, methacrylic resins, polypropylene, expanded polypropylene, fibrous polypropylene and expanded fibrous polypropylene.

3. A packaging element according to claim 1, wherein the outer sheet comprises multiple layers.

4. A packaging element according to claim 1, wherein the outer sheet has an average thickness from 0.2 to 5 mm.

5. A packaging element according to claim 1, having the shape of a tray or a box for the packing of meat, vegetables, fruit or cheese.

6. A packaging element according to claim 1, wherein said intermediate absorbing layer contains an antibacterial agent.

* * * * *